(12) United States Patent
Madhivanan et al.

(10) Patent No.: US 9,544,204 B1
(45) Date of Patent: Jan. 10, 2017

(54) DETERMINING THE AVERAGE READING SPEED OF A USER

(71) Applicants: Rajasimman Madhivanan, Sunnyvale, CA (US); Zaka Ur Rehman Ashraf, Pleasanton, CA (US); Edward J. Gayles, Tracy, CA (US); Martin D. Hock, Los Gatos, CA (US)

(72) Inventors: Rajasimman Madhivanan, Sunnyvale, CA (US); Zaka Ur Rehman Ashraf, Pleasanton, CA (US); Edward J. Gayles, Tracy, CA (US); Martin D. Hock, Los Gatos, CA (US)

(73) Assignee: Amazon Technologies, Inc., Reno, NV (US)

( * ) Notice: Subject to any disclaimer, the term of this patent is extended or adjusted under 35 U.S.C. 154(b) by 855 days.

(21) Appl. No.: 13/621,718

(22) Filed: Sep. 17, 2012

(51) Int. Cl.
*H04L 12/26* (2006.01)
*H04L 29/08* (2006.01)
*G04F 13/02* (2006.01)
*G06F 17/18* (2006.01)

(52) U.S. Cl.
CPC ............ *H04L 43/04* (2013.01); *G04F 13/02* (2013.01); *H04L 67/22* (2013.01); *G06F 17/18* (2013.01)

(58) Field of Classification Search
CPC .......... G04F 10/00; G04F 10/04; G04F 13/02; H04L 43/04; H04L 67/22; G06F 17/18
USPC .................................. 702/176, 181; 709/224
See application file for complete search history.

(56) References Cited

U.S. PATENT DOCUMENTS

| | | | | |
|---|---|---|---|---|
| 7,333,923 | B1 * | 2/2008 | Yamanishi | G06Q 10/06395 702/179 |
| 7,561,991 | B2 * | 7/2009 | Matsunaga | G06K 9/6297 703/2 |
| 8,260,915 | B1 * | 9/2012 | Ashear | H04L 43/04 709/224 |
| 8,577,827 | B1 * | 11/2013 | Sehn | H04L 67/2823 370/252 |
| 2003/0038754 | A1 * | 2/2003 | Goldstein | G06F 3/013 345/7 |
| 2011/0050594 | A1 * | 3/2011 | Kim et al. | 345/173 |
| 2011/0066965 | A1 * | 3/2011 | Choi | 715/776 |
| 2011/0195388 | A1 * | 8/2011 | Henshall et al. | 434/317 |
| 2012/0029873 | A1 * | 2/2012 | Chuang | G06F 17/18 702/181 |
| 2014/0055339 | A1 * | 2/2014 | Stanasolovich et al. | 345/156 |

* cited by examiner

*Primary Examiner* — Alexander Satanovsky
*Assistant Examiner* — Lina Cordero
(74) *Attorney, Agent, or Firm* — Lowenstein Sandler LLP

(57) ABSTRACT

A user device determines a reading speed value for each of a plurality of measurable units of an electronic publication. The user device adds each reading speed value into one of a plurality of data sets or one of a plurality of outlier sets. The user device calculates the average reading speed of the user based on one or more of the plurality of data sets.

24 Claims, 9 Drawing Sheets

DETERMINING THE AVERAGE READING SPEED OF A USER

BACKGROUND OF THE INVENTION

A large and growing population of users enjoys entertainment through the consumption of media items, including electronic media, such as electronic books (also referred to herein as ebooks), electronic newspapers, electronic magazines, and other electronic reading material. Users employ various electronic devices to consume such publications. Among these electronic devices are electronic book readers, cellular telephones, smart phones, personal digital assistants (PDAs), portable media players, tablet computers, electronic pads, netbooks, desktop computers, notebook computers, and the like.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION

As a user reads pages of an electronic publication, the user may have varying reading speeds for the different pages of the electronic publication. The user may read some pages very quickly. For example, the user may browse the table of contents, a preface, an abstract, etc., without reading the text of the pages in depth. The user may spend more of time reading other pages. For example, some pages may contain text in another language (e.g., a book to teach readers a foreign language) or some pages may contain formulas, equations, graphs, charts, or images that a user may want to analyze in depth (e.g., a math book may contain formulas). Thus, a user may have multiple ranges of reading speeds for the various pages of an electronic publication. For example, when the user is reading a math book, the user may be able to read pages which include explanatory information at around a first reading speed, but may read pages which include practice problem at around a second reading speed, which may be slow than the first reading speed.

Systems and methods in accordance with various embodiments of the present disclosure allow a user device to account for the different ranges of reading speeds for a user, when a user reads different electronic publications. As the user device obtains reading speed values (e.g., calculates reading speed values), the user device may add these reading speed values to data sets and outlier sets. The data sets may follow a normal distribution (e.g., the reading speed values in the data sets follow a normal distribution). As reading speed values are added to outlier sets, some of the reading speed values in the outlier sets may be used to create new data sets when there are a minimum number of reading speed values and when the reading speed values follow a normal distribution. The user device uses a weighted average of the values within the data sets to calculate an average reading speed for the user. The user device may also use the average reading speed for the user to estimate an amount of time remaining before the user finishes a portion of the electronic publication (e.g., how long it will take the user to finish a chapter, or finish a book).

Figure 1A:
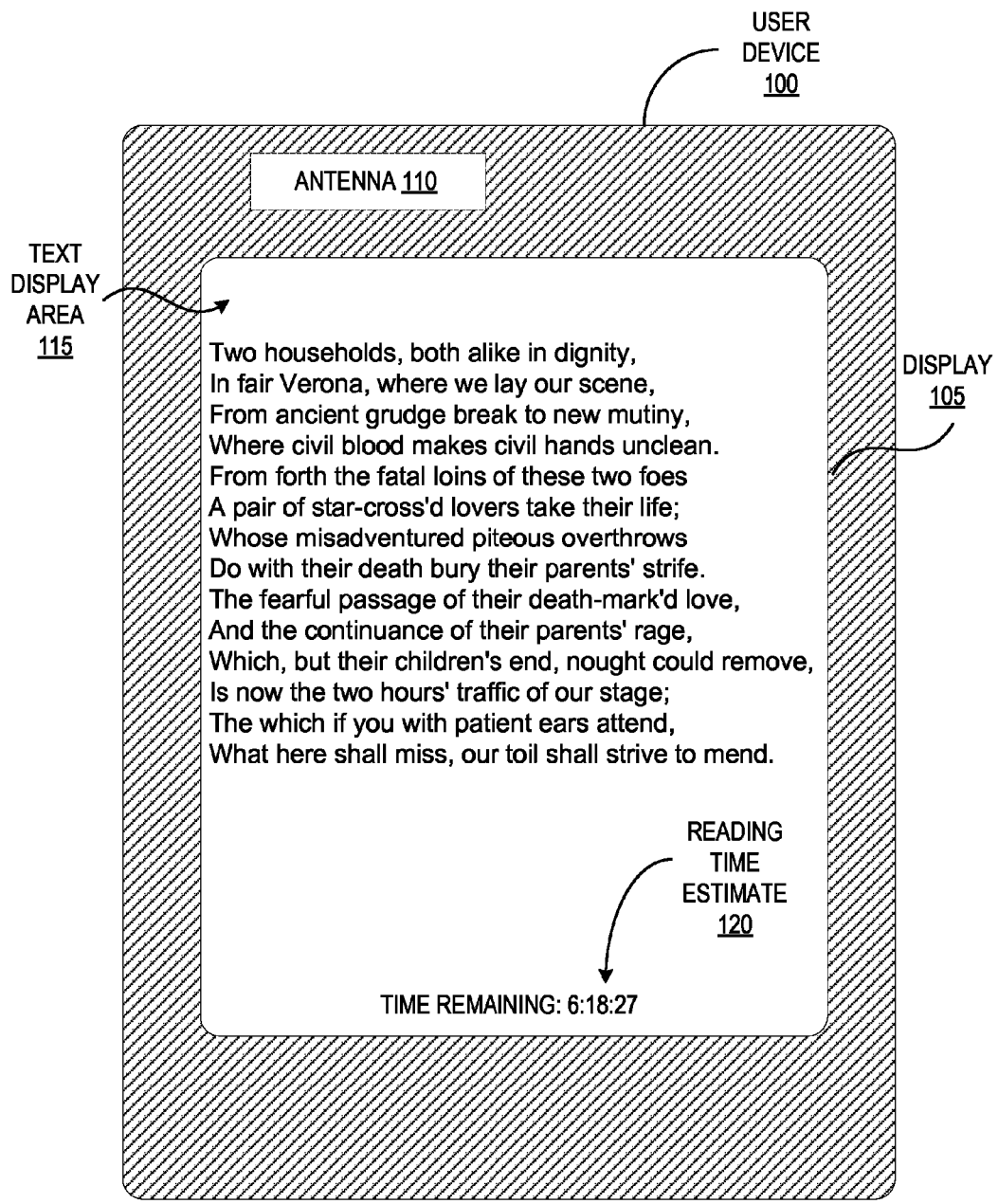
FIG. 1A illustrates a front side of a user device having a display, according to an embodiment.

FIG. 1A illustrates a front side of a user device 100 having a display 105. The user device 100 may be an electronic or computing device that may be used by a user to consume (e.g., read, listen, watch, etc.) digital media items (e.g., electronic books or publications, digital music, digital video, etc.). Examples of electronic or computing devices may include, but are not limited to, smart phones, tablet computers, laptop computers, desktop computers, portable music players, electronic book readers, netbooks, personal digital assistances (PDAs), etc. In one embodiment, user device 100 may include an antenna 110 disposed within a housing of the user device 105 and above or below the display 105. The antenna 110 may be used to communicate with different types of wireless networks. For example, the antenna 110 may be used to communicate with WiFi networks (e.g., 802.11a networks, 802.11b networks, 802.11n networks, etc.) or cellular networks (e.g., Long Term Evaluation (LTE) networks, High Speed Packet Access (HSPA) networks, Code Division Multiple Access (CDMA) networks, etc.). Display 105 may display content to the user, such as an electronic publication.

In one embodiment, the user device 100 may obtain (e.g., calculate) multiple reading speed values for a user. Each reading speed value may be for a page in an electronic publication. The user device 100 may add the multiple reading speed values to an initial set, a threshold exceeding set, one or more data sets, and one or more outlier sets, as discussed below in conjunction with FIGS. 2-4. The user device 100 may calculate an average reading speed using one or more of the initial set, the threshold exceeding set, or the one or more data sets, as described below in conjunction with FIGS. 2-4. The user device may also determine a remaining reading time for at least a portion of the electronic publication using the average reading time. For example, if the average reading time is in units of words per minute (WPM), the user device may determine how many words are remaining in the electronic publication and may divided the total number of words remaining by the average reading time, to calculate the reaming reading time.

In one embodiment, a user interface, displayed on display 105 may include a text display area 115 and a reading time estimate 120. In one embodiment, the reading time estimate may provide an indication of the remaining reading time for the current electronic publication. The user interface may be modified, automatically or in response to user input, to show different values (e.g., time remaining in the book, time remaining in the current chapter, average reading speed, etc.) This is merely one example of the features that may be implemented using the average reading speed, and one of skill in the art would recognize that there are many other possible applications or features for such data.

Figure 1B:
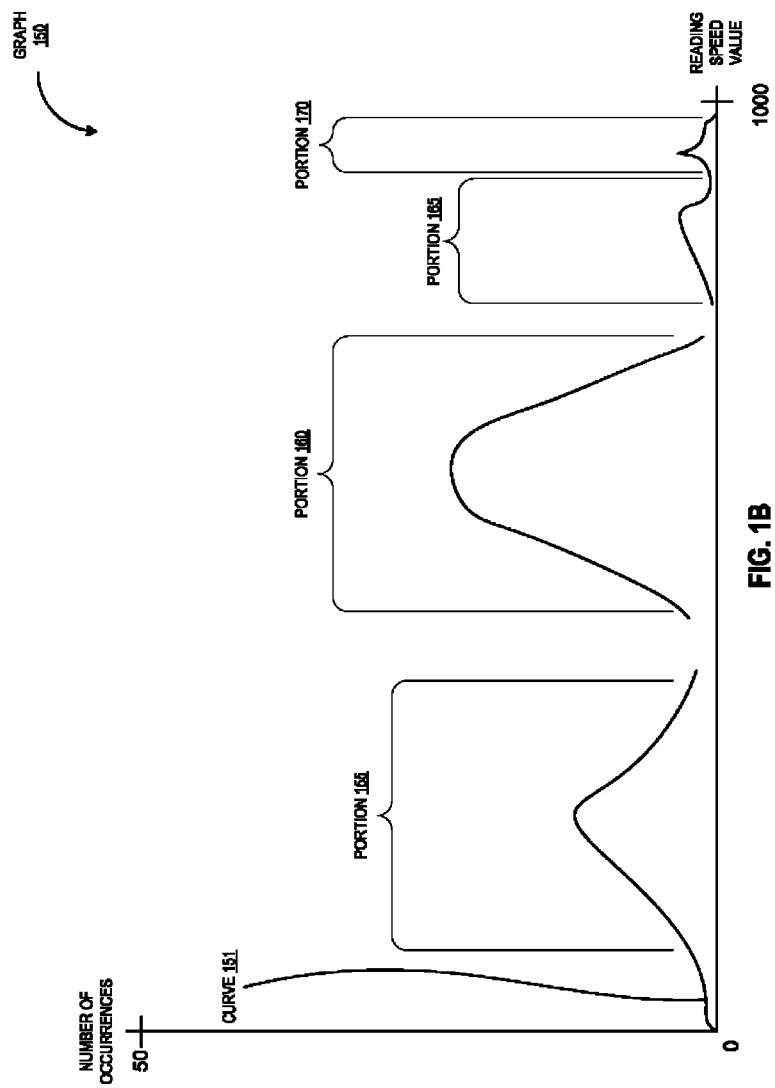
FIG. 1B illustrates an exemplary graph of curve formed by a plurality of reading speed values.

FIG. 1B illustrates an exemplary graph 150 of curve 151 formed by a plurality of reading speed values. The X-axis of the graph 150 represents the different reading speed values in the plurality of reading speed values starting from 0 to 1000. The Y-axis of the graph 150 represents the number of times a reading speed value is in the plurality of reading speed values (e.g., how many reading speed values of the curve 151 are in the plurality of reading speed values). The curve 151 represents how many times each of the different reading speed values appears within the plurality of reading speed values.

As shown in FIG. 1B, the different portions of the curve 151 form different shapes. The portions 155 and 160 form a shape similar to a bell curve. Thus, the portions 155 and 160 of the graph 151 may each follow a normal probability distribution. The portions 165 and 170 do not form a shape similar to a bell curve. For example, portion 165 is skewed towards the right and portion 170 is skewed towards the left. When a user device analyzes the plurality of reading speeds illustrated by curve 151, the user device may identify portions 155 and 160 to be normal probability distributions. The user devices may also identify portions 165 and 170 to be outliers or outlier distributions. Also as shown in FIG. 1B, the curve 151 is not continuous. For example, there is a gap in the curve 151 between portions 155 and 106, and a gap in the curve 151 between the portions 160 and 165. The gaps in the curve 151 may indicate that the reading speed values that are within the gaps do not appear within the plurality of reading speed values. For example, if the gap between portion 155 and portion 160 starts at reading speed value 375 and end at reading speed value 425, this may indicate that the plurality of reading speed values does not include any values that are between 375 and 425. In other embodiments, the curve 151 may be continuous (e.g., may have no gaps). This may indicate that every value on the X-axis of the graph appears within the plurality of reading speed values.

In one embodiment, as the user device obtains (e.g., calculates) more reading speed values and adds these reading speed values to the graph, the portion 165 or the portion 170 may being to form a shape similar to a bell curve. For example, as the user devices determines additional reading speed values, the values may be added to the left side of the portion 165 and the portion 165 may form a bell curve shape. The user device may then identify the portion 165 as a normal probability distribution using reading speed values that are in the portion 165.

Figure 2:
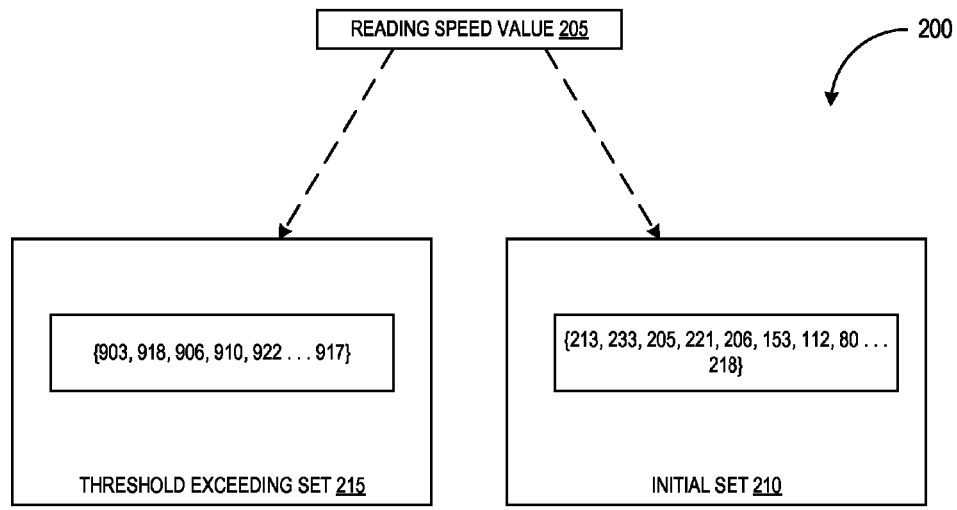
FIG. 2 is a block diagram illustrating an allocation of reading speed values into different sets of reading speed values, according to one embodiment.

FIG. 2 is a block diagram illustrating an allocation 200 of reading speed values into different sets of reading speed values, according to an embodiment. The allocation 200 includes two sets of reading speed values, an initial set 210 and a threshold exceeding set 215. The allocation 200 may be used by a user device (e.g., user device shown in FIGS. 1 and 5 during a first phase (e.g., a first stage) of a reading speed calculation method or operation (as described later in conjunction with FIG. 7). During the first phase of the reading speed calculation method, the user device may receive, obtain, or calculate, multiple reading speed values.

For example, referring to FIG. 1, when a user finishes reading a page of an electronic publication displayed on the text display area 115, the user device 100 may determine the number of words displayed in the text display area 115 and the amount of time it took the user to read text in the text display area (e.g., the amount of time the page is displayed to the user). The user device 100 may obtain or calculate a reading speed value for the page of the electronic publication by dividing the number of words in the page displayed to the user by the amount of time that the page was displayed to the user. In one embodiment, the user device 100 may receive, obtain, or calculate a reading speed value for each page displayed to the user in the text display area 115.

As the user device receives, obtains, or calculates each reading speed value 205, the user device may determine whether the reading speed is greater than a threshold speed. For example, the user device may determine whether the reading speed is greater than 900 words per minute (WPM). If the reading speed 205 is less than or equal to the threshold speed (e.g., 900 WPM), the user device may add the reading speed to the initial set 210. If the reading speed is greater than the threshold speed (e.g., 900 WPM), the user device may add the reading speed to the threshold exceeding set 215. The threshold exceeding set 215 includes a set of reading speed values that a above an exemplary threshold speed of 900 WPM (e.g., 905 WPM, 918 WPM, 906 WPM, 910 WPM, 922 WPM . . . 917 WPM). The initial set 210 includes a set of reading speed values that are less than or equal to the exemplary threshold speed of 900 WPM (e.g., 213 WPM, 233 WPM, 205 WPM, 221 WPM, 206 WPM, 153 WPM, 112 WPM, 80 WPM . . . 218 WPM).

The user device may use one or more of the initial set 210 and the threshold exceeding set 215 to obtain (e.g., determine or calculate) an average reading speed for the user (e.g., the average reading speed for the pages of the electronic publication that have been read by the user) during the first phase or stage of the reading speed calculation method or operation. In one embodiment, the user device obtains the average reading speed by calculating the average value of the reading speed values in the initial set 210 if the number of reading speed values is greater than a first threshold number (e.g., if there are more than 3 reading speed values in the initial set 210). In another embodiment, the user device obtains the average reading speed by calculating the average value of the reading speed values in the threshold exceeding set 215 when there are no reading speed values in the initial set 210 and there is at least one reading speed value in the threshold exceeding set 215. In a further embodiment, the user device obtains the average reading speed by calculating the weighted average of the reading samples in both the initial set 210 and the threshold exceeding set 215 if the number of reading speed values in the initial set is between one and the first threshold number (e.g., between 1 and 3).

In one embodiment, as each reading speed value is added to the initial set 210, the user device determines whether the number of reading speed values in the initial set 210 is greater than or equal to a second threshold number (e.g., 15). If the number of reading speed values in the initial set 210 is greater than or equal to the second threshold number (e.g., 15), the user device may then determine whether a data set can be creating using the reading speed values in the initial set 210. The user device determines whether the data set can be created by determining whether a minimum number (e.g., 10) of reading speed values can be added to the data set, such that the reading speed values in the data set follow a normal distribution (e.g., the data set follows a normal probability distribution). If a data set can be created with a subset of reading speed values that is greater than the minimum number (e.g., there are at least 10 reading speed values in the subset) and that follow a normal distribution, the user device creates the data set and adds the subset of reading speed values from the initial set 210, to the data set (as described below in conjunction with FIG. 3). The user device creates one or more outlier sets and the remaining reading speed values in the initial set 210 and the threshold exceeding set 215 are added to the one or more outlier sets (as described below in conjunction with FIG. 3).

Although the present disclosure may refer to normal probability distributions, in other embodiments, different types of probability distributions may be used. For example, the data set may follow a Poisson distribution, a gamma distribution, a chi-squared distribution, an exponential distribution, a log-normal distribution, a Pareto distribution etc.

In another embodiment, as each reading speed is added to the threshold exceeding set 215, the user device may determine whether the number of reading speed values in the threshold exceeding set 215 is greater than a third threshold number (e.g., whether there are more than 100 reading speed values in the threshold exceeding set 215). If the number of reading speed values in the threshold exceeding set 215 is greater than the third threshold number, (e.g., 100), the user device may create a data set using a subset of reading speed values from the threshold exceeding set 215 (e.g., the user device may identify a normal probability distribution from using the subset of reading values from the threshold exceeding set 215). The user device may create one or more outlier sets and may add the remaining reading speed values in the threshold exceeding set 215 and the initial set 210 into the one or more outlier sets. The data set may follow a normal probability distribution (e.g., the reading speed values in the data set follow a normal distribution).

In one embodiment, after the user device creates the first data set (using a subset of values from the initial set 210 or the threshold exceeding set 215 as discussed above) and one or more outlier sets (using the remaining reading speed values), the user device may complete or finish the first phase or first stage of the reading speed calculation method or operation. In another embodiment, the after the user device creates the first data set (e.g., identifies a normal probability distribution) and one or more outlier sets (e.g., after the first phase or first stage of the reading speed calculation method or operation completes), the user device may use the first data set to obtain (e.g., calculate) the average reading speed of the user (as discussed in more detail below in conjunction with FIG. 3).

Figure 3:
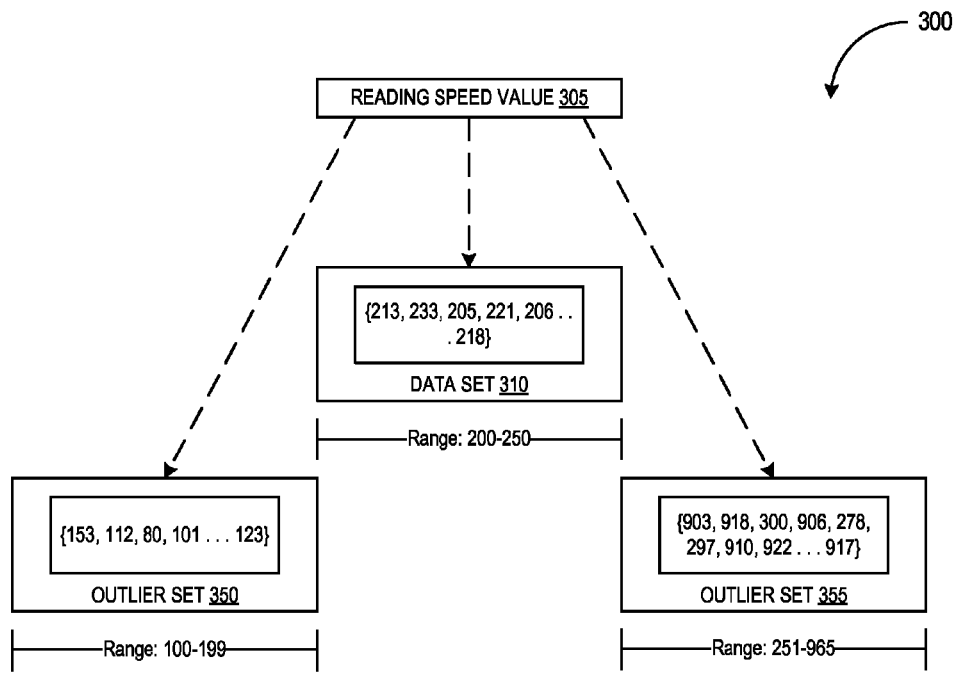
FIG. 3 is a block diagram illustrating an allocation of reading speed values into different sets of reading speed values, according to another embodiment.

FIG. 3 is a block diagram illustrating an allocation of reading speed values into different sets of reading speed values, according to another embodiment. The allocation 300 includes three sets of reading speed values, data set 310 and outlier sets 350 and 355. The allocation 300 may be used by a user device (e.g., user device shown in FIGS. 1 and 5 during a second phase or second stage of a reading speed calculation method or operation (as described later in conjunction with FIG. 7). The second phase or second stage of the reading speed calculation method or operation may occur after the user device creates a first data set (e.g., creates data set 310 or identifies a normal probability distribution) and one or more outlier sets (e.g., outlier sets 350 and 355).

As shown in FIG. 3, the reading speed values that were previously allocated to an initial set and a threshold exceeding set (e.g., initial 210 and threshold exceeding set 215 shown in FIG. 2) have been added to the data set 310 and the outlier sets 350 and 355. The data set 310 may follow a normal probability distribution (e.g., the reading speed values in the data set follow a normal distribution). The data set 310 has a range of 200 to 250 (e.g., the reading speed values in the data set 310 are between 200 and 250). The outlier sets 350 and 355 included reading speed values that were not added to the data set 310. The reading speed values in the outlier sets 350 and 355 may not have been added to the data set 310 because they do not follow the normal probability distribution of data set 310. The outlier set 350 has a range of 100 to 199 (e.g., the reading speed values in the outlier set 350 are between 100 and 199) and the outlier set 355 has a range of 251 to 965 (e.g., the reading speed values in the outlier set 350 are between 100 and 199).

The ranges of the data set 310 and the outlier sets 350 and 355 are merely exemplary, and other embodiments may have different ranges for the data set 310 and the outlier sets 350 and 355. Although the ranges for the data set 310 and the outlier sets 350 and 355 do not overlap, in other embodiments, the ranges for the data set 310 and the outlier sets 350 and 355 may overlap. For example, the range of the data set 310 may be between 178 and 256 and the range of the outlier set 350 may be between 100 and 184.

In one embodiment, the user device may use the data set 310 to determine the average reading speed for a user. For example, the user device may calculate the average value of the all the reading speed values in the data set 310 to determine the average reading speed for the user.

During the second phase of the reading speed calculation method, the user device may continue to receive, obtain, or calculate, multiple reading speed values. For example, as the user continues to read pages of an electronic the user device may calculate a reading speed value for each page of the electronic publication read by the user. As the user device receives a reading speed value 305, the user device may add the reading speed value to one of the data set 310, outlier set 350, and outlier set 355. In one embodiment, the user device may add the reading speed value 305 to the data set 310 if reading speed value 305 fit within the normal probability distribution for the reading speed values in the data set 310. If the reading speed value 305 does not fit within the normal probability distribution for the reading speed values in the data set 310 (e.g., the reading speed value 305 is an outlier value that may not belong within the normal distribution), the user device may added the reading speed value 305 to one of the outlier sets 350 or 355, depending on the value of the reading speed value 305. For example, if the reading speed value is within the range of the outlier set 350, the reading speed value 305 may be added to the outlier set 350. In another example, if the reading speed value is within the range of the outlier set 355, the reading speed value 305 may be added to the outlier set 355.

In one embodiment, the user device may use Chauvenet's criterion to determine whether the reading speed value fits within the normal probability distribution for the reading speed values in the data set 310. Chauvenet's criterion may use the mean and standard deviation of the normal probability distribution to determine whether the reading speed value is an outlier. Based on how much the reading speed value differs from the mean, Chauvenet's criterion uses the normal distribution function to determine the probability that a given data point will be at the value of the reading speed value. If the probability is below a certain threshold (e.g., below 50%), the reading speed value is an outlier (e.g., does not fit within the normal probability distribution). In other embodiments, the user device may use other criterion, methods, algorithms, or techniques to determine whether the reading speed value 305 may be added to the data set 310. For example, the user device may use Grubb's test, Pierce's criterion, Dixon's Q test, etc., to determine whether the reading whether the reading speed value may be added to the data set 310.

In one embodiment, the data set 310 may also include data indicative of one or more of the number of reading speed values in the data set 310, the sum of all the reading speed values in the data set 310, and the sum of the squares of the reading speed values in the data set 310. When a reading speed value 305 is added to the data set 310, one or more of these values may be updated (e.g., re-calculated) to reflect the newly added reading speed value 305. For example, if a reading speed value 305 is added to the data set 310, the number of reading speed values in the data set 310 increases by 1 and the sum of the reading speed values in the data set 310 increases as well.

Figure 4:
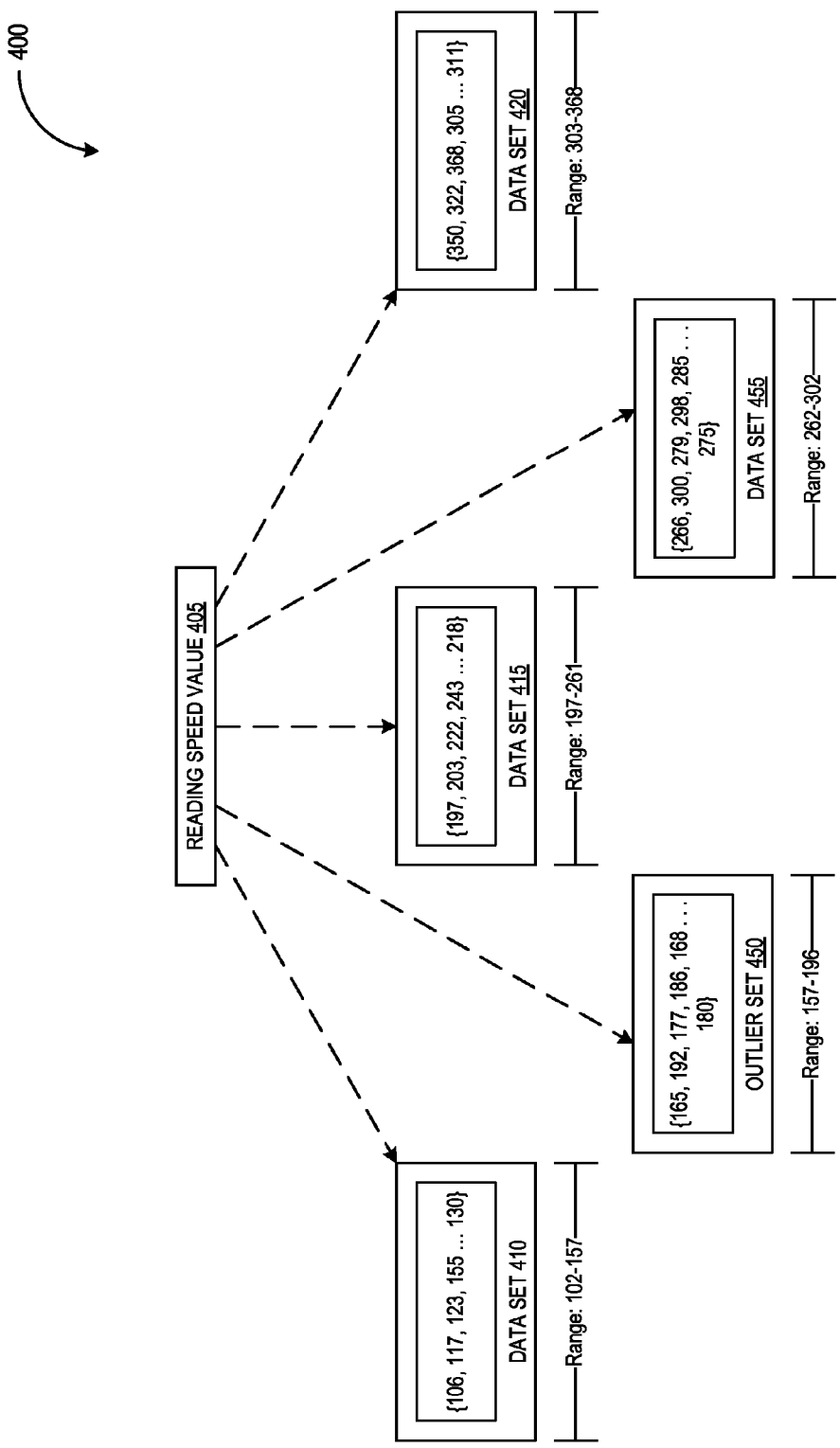
FIG. 4 is a block diagram illustrating an allocation of reading speed values into different sets of reading speed values, according to a further embodiment.

FIG. 4 is a block diagram illustrating an allocation 400 of reading speed values into different sets of reading speed values, according to a further embodiment. The allocation 400 includes data sets 410, 415, and 420, and outlier sets 450 and 455. The allocation 400 may be used by a user device (e.g., user device shown in FIGS. 1 and 5) during a second phase or second stage of a reading speed calculation method or operation (as described later in conjunction with FIG. 7).

As shown in FIG. 4, the reading speed values that were previously allocated to outlier sets (e.g., outlier set 350 and 355 shown in FIG. 3)) have been added to the data sets 410 and 420. In one embodiment, as reading speed values are added to outlier sets, the reading speed values within the outlier sets may follow a normal probability distribution. When a subset of the reading speed values in an outlier set follows a normal probability distribution, and there are a minimum number of reading speed values in the subset (e.g., at least 10 reading speed values in the subset), the user device may create a new data set (e.g., may identify a new normal probability distribution based on reading speeds values in the outlier set) and may add the subset of reading speed values from the outlier data set to the new data set. For example, the data set 410 may contain reading speed values (e.g., a subset of reading speed values) that were previously in an outlier set (e.g., previously in outlier set 350 as shown in FIG. 3). The subset of reading speed values that were previously in the outlier set 350 follow a normal probability distribution and there may be a minimum number of reading speed values (e.g., 10 values in the subset) so the user device may create the data set 410 (e.g., identify a normal probability distribution using the reading speed values in the outlier set 350) and add the subset of reading speed values to the data set 410. Similarly, the data set 420 may include a subset of reading speed values that were previously in an outlier set (e.g., previously in outlier set 355 shown in FIG. 3).

Each of the data sets 410, 415, and 420 may follow a normal probability distribution (e.g., the reading speed values in the data set follow a normal distribution). The data set 410 has a range of 102 to 157, the data set 415 has a range of 197 to 261, and the data set 420 has a range of 300 to 368. The outlier sets 450 and 455 included reading speed values that were not added to the data sets 410, 415, and 420. The reading speed values in the outlier sets 450 and 455 may not have been added to the data sets 410, 415, and 420 because they do not follow a normal probability distribution (e.g., they are outliers in the normal probability distributions of the reading speed values in the data sets 410, 415, and 420). The outlier set 450 has a range of 157 to 196 and the outlier set 455 has a range of 262 to 302.

The ranges of the data sets 410, 415, and 420, and the outlier sets 450 and 455 are merely exemplary, and other embodiments may have different ranges for the data sets 410, 415, and 420 and the outlier sets 450 and 455. Although the ranges for the data sets 410, 415, and 420 and the outlier sets 450 and 455 do not overlap, in other embodiments, the ranges for the data sets 410, 415, and 420 and the outlier sets 450 and 455 may overlap. For example, the range of the data set 310 may be between 178 and 256 and the range of the outlier set 350 may be between 100 and 184. In other embodiments, the allocation 400 may include more data sets or more outlier sets. For example, the allocation 400 may include four data sets and five outlier sets.

In one embodiment, the user device may use one or more of the data sets 410, 415, and 420 to determine the average reading speed for a user. The user device may identify the data set with the largest number of reading speed values. The user device may then identify all data that have a number of reading speed values within a threshold of the largest number of reading speed values. For example, the user device may identify data sets that have at least one third the number of reading speed values in the largest data set. The user device may then take the weighted average of all of the identified data sets to determine the average reading speed for the user.

During the second phase of the reading speed calculation method, the user device may continue to receive, obtain, or calculate, multiple reading speed values. For example, as the user continues to read pages of an electronic the user device may calculate a reading speed value for each page of the electronic publication read by the user. As the user device receives a reading speed value 405, the user device may add the reading speed value to one of the data sets 410, 415, and 420 and the outlier sets 450 and 455. In one embodiment, the user device may add the reading speed value 405 to one of the data sets 410, 415, and 420 if the reading speed value 405 fit within the normal probability distribution for the reading speed values in one of the data sets 410, 415, and 420. In one embodiment, the user device may add the reading speed value 405 to the data set which has the least standard deviation for the reading speed value 405 (e.g., the data set that has the highest probability of accepting the reading speed value 405). If the reading speed value 405 does not fit within the normal probability distribution for the reading speed values in the data sets 410, 415, and 420 (e.g., the reading speed value 405 is an outlier), the user device may add the reading speed value 405 to one of the outlier sets 450 or 455, depending on the value of the reading speed value 405. For example, if the reading speed value 405 is within the range of the outlier set 450, the reading speed value 405 may be added to the outlier set 450.

In one embodiment, the user device may use Chauvenet's criterion to determine whether the reading speed value 405 fits within the normal probability distribution for the reading speed values in the data set 310. In other embodiments, the user device may use other criterion, methods, algorithms, or techniques (e.g., Grubb's test, Pierce's criterion, Dixon's Q test, etc.) to determine whether the reading speed value 405 may be added to the data sets 410, 415, and 420.

In one embodiment, each of the data set 410, 415, and 420 may also include data indicative of one or more of the number of reading speed values in the data set, the sum of all the reading speed values in the data set, and the sum of the squares of the reading speed values in the data set. When a reading speed value 405 is added to a data set, one or more of these values may be updated (e.g., re-calculated) to reflect the newly added reading speed value 405.

Figure 5:
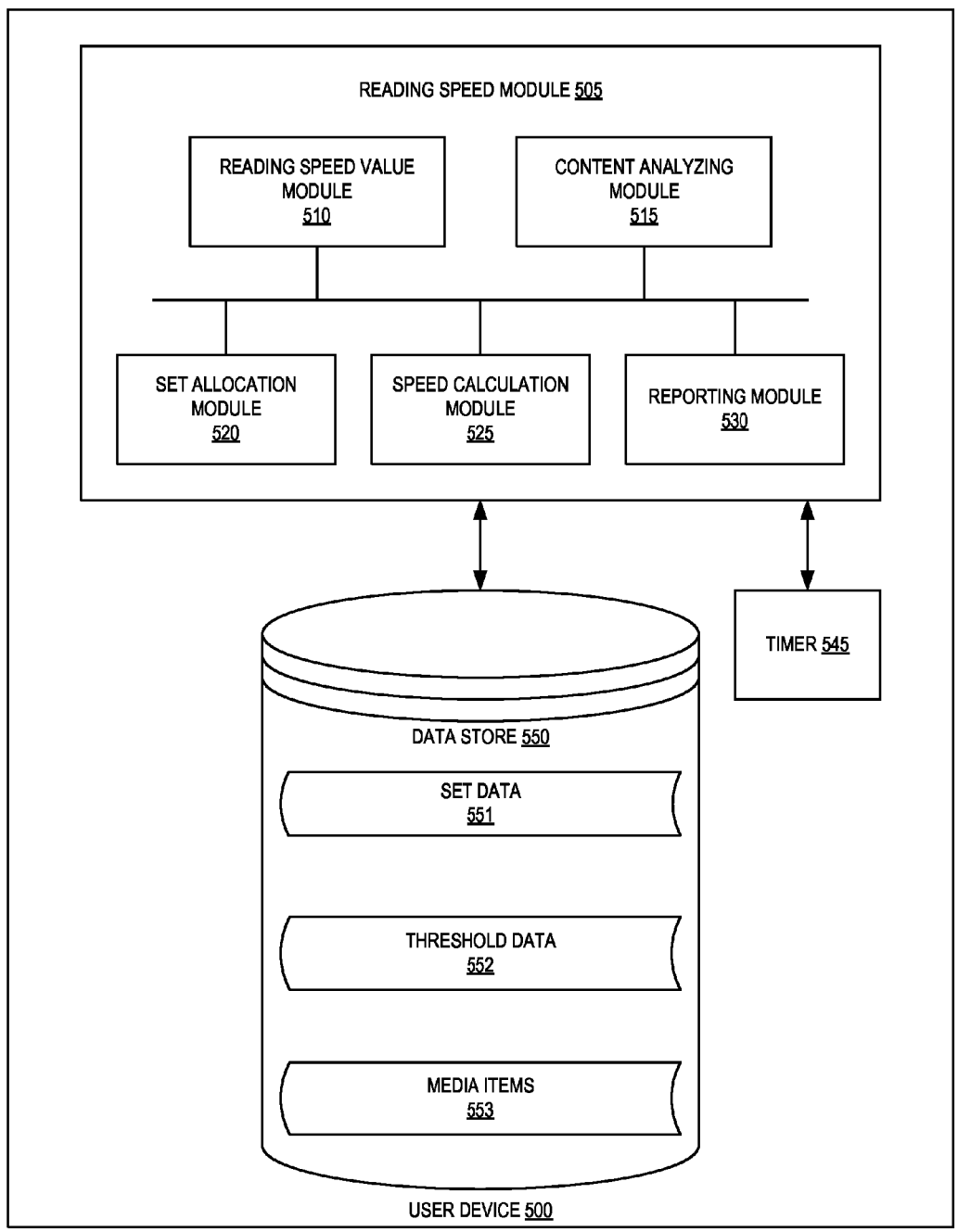
FIG. 5 is a block diagram illustrating a user device, according to an embodiment.

FIG. 5 is a block diagram illustrating an exemplary user device 500, according to one embodiment. The user device 500 includes a headset module 505 in communication with a data store 550. The data store 550 may be a file system, a database, a data storage device, a hard disk drive, a flash drive, random access memory (RAM), or any device or component capable of storing data. The data store 550 includes set data 551, threshold data 552, and media items 553. The user device 550 may include a timer 545. The timer 545 may be a component of the reading speed module 505, or may be external to the reading speed module 505, as shown.

In one embodiment, the set data 551 may include data representing the initial set and the threshold exceeding set (as shown in FIG. 2), one or more data sets and one or more outlier sets (as shown in FIGS. 3 and 4). For example, the set data 551 may include data such as the reading speed values that are in a data set or an outlier set, the number of reading speed values in the set, the average value of the reading speed value for the set, etc. The set data 551 may be updated when new reading speed values are obtained (e.g., received or calculated) by the user device 500.

In one embodiment, the threshold data 352 may include data indicative of one or more threshold values or parameters used by a reading speed calculation method or operation. For example, the threshold data 352 may include data indicating the threshold number of values that should be in a subset of reading speed values of an outlier set, before a data set can be created using the outlier set. In another example, the threshold data 352 may include data indicating a threshold reading speed value to use for determining whether a reading speed value should be included in an initial set or a threshold exceeding set.

In one embodiment, the media items 553 may include electronic publications (e.g., electronic books, electronic magazines, etc.) that the user is reading. The reading speed module 505 may obtain (e.g., calculate) the average reading speed of a user for each of the media items 553. The media items may be received from a digital content providing system (e.g., one or more servers accessed by the user device 500 via a network, such as one or more of a private network, a public network like the internet, a WiFi network, a cellular network, etc.).

The reading speed module 505 includes a reading speed value module 510, a content analyzing module 515, a set allocation module 520, a speed calculation module 525, and a reporting module 530. In one embodiment, the content analyzing module 515 may determine the number of units (e.g., words, characters, lines, etc.) in a portion of a digital media item (e.g., in a page of an electronic publication). The portion of content may vary in different embodiments and may be configurable by the user. Each portion may represent a measurable unit of the media item and may include, for example, characters, words, lines, sentences, paragraphs, pages, chapters, sections, books, images, any other measureable unit, or any combination of these units. Electronic publications may have variable sized fonts, and the user device 500 can re-page material based on the amount of text that can fit on a single page using a selected font size. In one embodiment, a page may be the portion of the media item that is displayed on a display screen. Thus, the amount of content displayed in a page may vary depending on how the user changes font sizes, re-pages material, etc. Additionally, the user device 500 may divide the text of electronic publications into pages based on contents of the text. For example, if a specific portion of the text deals with a particular topic, then that portion of the text may be included in a separate page than other adjacent text that deals with another topic. This may be the case even if there is space for text discussing both topics to be displayed on a single page at a current chosen font size. These or other variations may affect the portion of content being measured, and in turn affect the reading behavior measurement. The content analyzing module 515 may analyze the portion of the digital media item (e.g., the page of an electronic publication) to determine the measurable unit of the portion media item (e.g., the number of words on a page) and may provide the measurable unit to the reading speed value module.

In one embodiment, the reading speed value module 510 may calculate a reading speed value for a user for a page of an electronic publication. The reading speed value module 510 may use a timer 545 and the content analyzing module 515 to calculate a reading speed value for the page of the electronic publication. The reading speed value module may track the amount of time that a user spends reading a page using the timer 545. For example, reading speed value module 510 may start timer 545 when a portion (e.g., one page) of an electronic publication is initially displayed, and stop the timer 545 when the user issues a change page command. In one embodiment, the timer 545 may be delayed to account for the rendering or refresh time of a display of the user device, or reading behavior tracking module may otherwise account for any delay that may occur. Thus, reading speed value module 510 can determine how much time the user spends reading each portion of a digital media item and/or how many portions of the digital media item the user finishes reading. The reading speed module 510 may also receive the number of units in the portion of the digital media item from the content analyzing module 515. For example, the reading speed module 510 may receive the number of words on the page of the electronic publication. The reading speed module 510 may be able to calculate the reading speed value for the page of the electronic publication, based on the amount of time the user spend reading the page, and based on the number of words in the page. For example, the reading speed module 510 may divide the total number of words in the page by the amount of time the user spend reading the page, to obtain the readers reading speed in terms or words per minute (WPM). In other embodiments, the reading speed value may be expressed differently, using different measureable units (e.g., characters, pages, chapters) and/or time values (e.g., seconds, milliseconds, hours).

In one embodiment, the user device 500 may include one or more sensors such as touch sensors, proximity sensors or motion sensors that the user device can use to identify whether the user device is being held by a user. If the reading speed value module 510 determines that a user is taking an uncharacteristically long time reading through a portion of text, it may check data from the sensors to determine whether the user device 500 is being held by a user. If the user device 500 is not being held by a user and no page turn signal has been sent to the user device for a threshold period of time, the reading speed value module 510 may determine that the user is not currently reading the current portion of text, and stop the timer 545 and/or deduct time from the timer 545. In another embodiment, the user device 500 includes an optical sensor that tracks user eye movement. Reading speed value module 510 may then correlate the user eye movement to currently displayed portions of text. This information may be used to more accurately identify how a user is progressing through particular portions of reading, whether a user is nodding off (e.g., if eyes are detected to be closed or droopy), or whether a user is not looking at the user device (in which case the timer 545 can be paused). Thus, the optical sensor can be used to determine when a user has completed reading a portion of the electronic media rather than using a page turn signal.

In one embodiment, the set allocation module 520 may create the initial set, the threshold exceeding set, the data sets, and the outlier sets illustrated in FIGS. 2-4. For example, the set allocation module 520 may determine whether a data set may be created using a subset of the initial set or the threshold exceeding set, as discussed above in conjunction with FIGS. 2-3. In another example, the set allocation module 520 may determine whether a data set may be created using a subset of an outlier set, as discussed above in conjunction with FIG. 3. The set allocation module 520 may create the data set when the subset of reading speed values follows a normal probability distribution and when the subset of reading speed values if greater than a threshold size. In another embodiment, the reading module may also add reading speed values to the initial set, the threshold exceeding set, the data sets, and the outlier sets, based on the reading speed value and certain thresholds, as discussed above in conjunction with FIGS. 2-4. For example, during the first phase of a reading speed calculation operation or method, the set allocation module 520 may determine whether a reading speed value should be added to the initial set or to the threshold exceeding set, based on whether the reading speed value exceeds a first threshold.

In one embodiment, the reading speed module 525 may obtain (e.g., calculate) the average reading speed of a user for an electronic publication. During a first phase or stage, the reading speed module 525 may use one or more of the initial set and the threshold exceeding set when calculating the average reading speed. If there are no reading speed values in the initial set, the reading speed module 525 obtains the average reading speed by calculating the average value of the reading speed values in the threshold exceeding set. If the number of reading speed values in the initial set is greater than a threshold, the reading speed module 525 obtains the average reading speed by calculating the average value of the reading speed values in the initial set. If the number of reading speed values in the initial set is between 1 and the threshold, the reading speed module 525 obtains the average reading speed by calculating the weighted average of the reading speed values in the initial set and the threshold exceeding set. During a second phase or stage (e.g., after the first data set is created from the initial set or the threshold exceeding set), the reading speed module may obtain (e.g., calculate) the average reading speed using one or more data sets. If there is only one data set, the reading speed module 525 may calculate the average value of the reading speed values within the one dataset. If there are multiple data sets, the reading speed module 525 may 525 may obtain the average value by calculating the weighted average of the of the reading speed values within any data set that exceeds a threshold sized (e.g., any data set that is ⅓ the size of the largest data set).

In one embodiment, reporting module 530 may provide the user's average reading speed to an item providing system, such as a digital content providing system (e.g., one or more servers). The item providing system may store the average reading speed of a user for multiple media items (e.g., for multiple electronic publications) for later use. In addition, the reporting module 520 may calculate or determine the amount of time left for a user to finish reading at least a portion of the electronic publication, based on the average reading speed. In one embodiment, the reporting module 520 may calculate the estimated remaining time by determining the number of units (e.g., words) left in the portion of the electronic publication and dividing the number of units by the average reading speed. For example, the user may have an average reading speed of 200 WPM. The reporting module 520 may determine that there are 1000 words before the user reaches the end of a chapter in the electronic publication and the reporting module 520 may indicate to the user an estimated remaining time (e.g., display a "time remaining" of 5 minutes) for the chapter. In another example, the reporting module 520 may determine that there are 13000 words before the user reaches the end of the electronic publication and that the user is reading at an average speed of 250 WPM. The reporting module 520 may display an estimated remaining time of 52 minutes for the electronic publication to the user. In another embodiment, the reporting module 520 may calculate the estimated remaining time by multiplying the number of pages remaining in the portion of the electronic publication with the average reading speed of the user. For example, the reporting module 520 may determine that the reading speed of the user is 5 minutes per page and that there are 21 pages remaining in an electronic publication. The reporting module 520 may display an estimated time remaining of 105 minutes for the electronic publication to the user.

Figure 6:
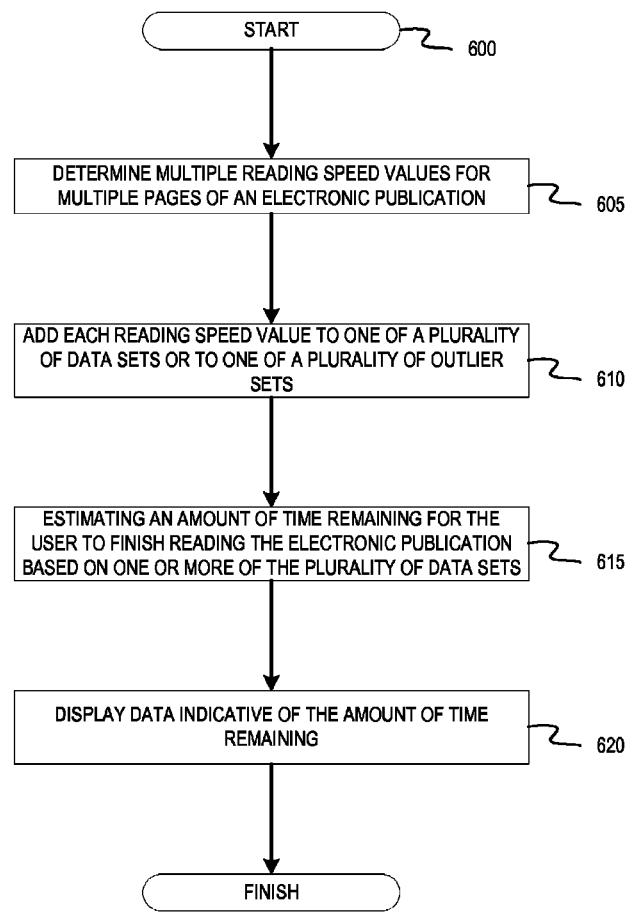
FIG. 6 is a flow diagram illustrating a method of estimating a remaining reading time for a portion of an electronic publication, according to one embodiment FIG. 7 Is a flow diagram illustrating a method of receiving a reading speed value and adding the reading speed value to one or more sets of reading speed values, according to one embodiment.
Figure 7:
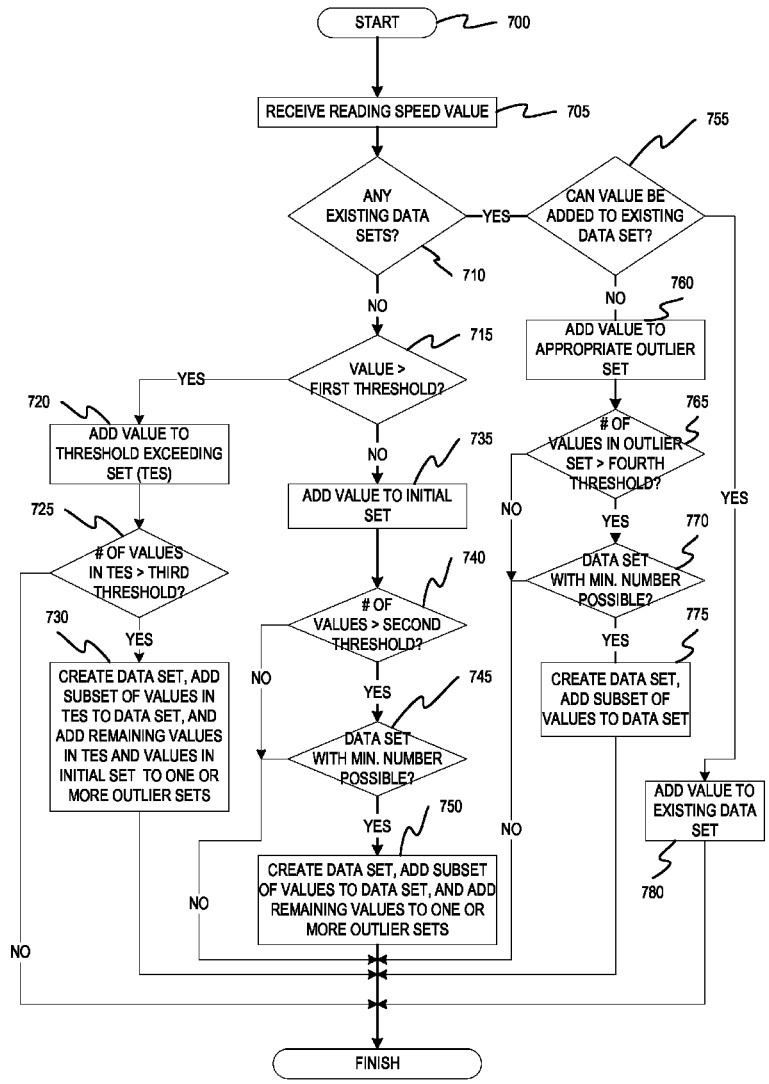
Figure 8:
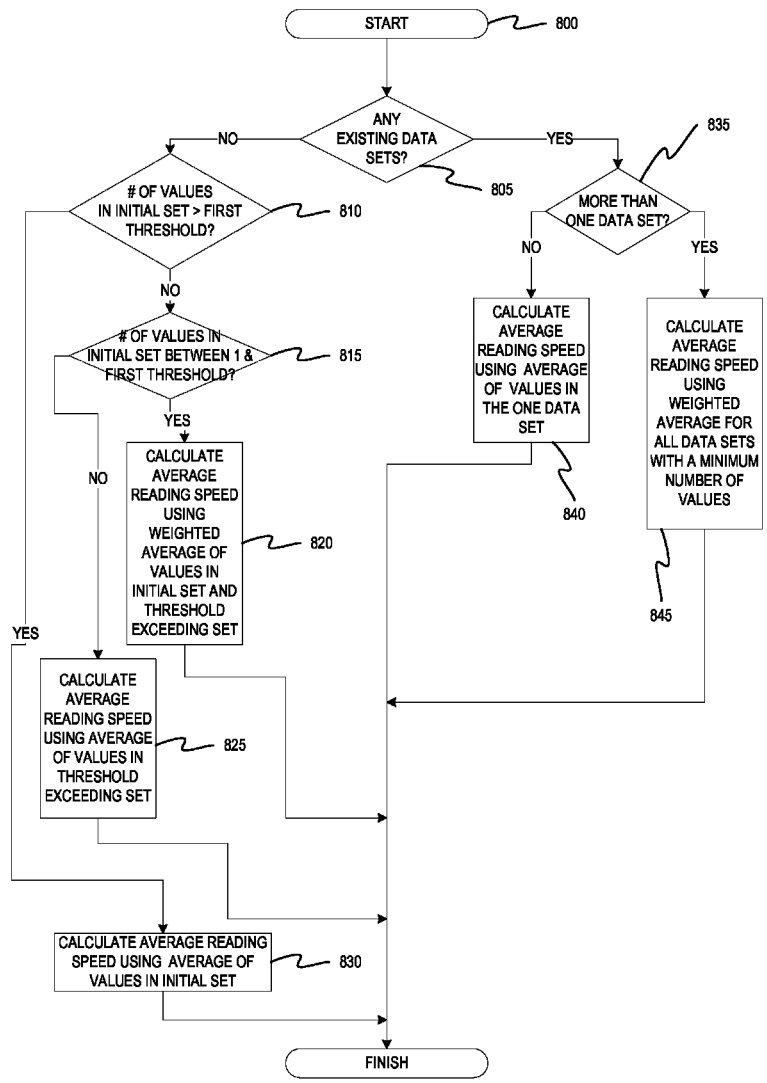
FIG. 8 is a flow diagram illustrating a method 800 of calculating an average reading speed for a user, according to one embodiment.

FIGS. 6-8 are flow diagrams illustrating methods for calculating an average reading speed of a user. For simplicity of explanation, the methods are depicted and described as a series of acts. However, acts in accordance with this disclosure can occur in various orders and/or concurrently and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

FIG. 6 is a flow diagram illustrating a method 600 of estimating a remaining reading time for a portion of an electronic publication, according to one embodiment. The method 600 may be performed by processing logic that comprises hardware (e.g., circuitry, dedicated logic, programmable logic, microcode, etc.), software (e.g., instructions run on a processor to perform hardware simulation), or a combination thereof. In one embodiment, method 600 may be performed by a reading speed module, as shown in FIG. 5.

Referring to FIG. 6, the method 600 begins at block 605 where the method 600 determines multiple reading speed values for multiple pages of an electronic publication (as discussed above in conjunction with FIG. 4). For example, the method 600 may divide the total number of words on a page of the electronic publication by the amount of time it took the user to read the page, in order to calculate the user's reading speed for the page in terms of WPM. At block 610, the method adds each of the multiple reading speed values to one or a plurality of data sets or to one of a plurality of outlier sets (as discussed above in conjunction with FIG. 4). The method 600 estimates an amount of time remaining for a user to finish reading the electronic publication, based on one or more of the plurality of data sets at bock 615. For example, as discussed above in conjunction with FIG. 4, the method 600 may calculate the weighted average of the reading speed values in all data sets which are above a threshold size (e.g., all data sets which are at least ⅓ the size of the largest data set). The method 600 may estimate the amount of time remaining for the user to finish the electronic publication based on the average reading speed. For example, the method 600 may divided the number of words in the remaining portions of the electronic publication by the user's average reading speed. At block 620, the method 600 may display data indicative of the estimated amount of time remaining for the user to finish reading the electronic publication. For example, the method 600 may display a "Time Remaining" value, as shown in FIG. 1. After block 620, the method 600 ends.

FIG. 7 is a flow diagram illustrating a method 700 of receiving a reading speed value and adding the reading speed value to one or more sets of reading speed values, according to one embodiment. The method 700 may be performed by processing logic that comprises hardware (e.g., circuitry, dedicated logic, programmable logic, microcode, etc.), software (e.g., instructions run on a processor to perform hardware simulation), or a combination thereof. In one embodiment, method 700 may be performed by a reading speed module, as shown in FIG. 5.

Referring to FIG. 7, the method 700 starts at block 705, where the method 700 receives a reading speed value. The method 700 determines whether there are any existing data sets. If there are no data sets (e.g., no data sets have been created yet), the method 700 moves on to block 715. At block 715, the method 700 determines whether the reading speed value is greater than a first threshold (e.g., greater than 900 WPM). If the reading speed value is greater than the first threshold, the reading speed value is added to the threshold exceeding set (TES) at bock 720. At block 725, the method 700 determines whether the number of reading speed values is greater than a third threshold (e.g., 100). If the reading speed is below the first threshold, the method 700 adds the reading speed value to the initial set at block 735. At block 740, the method 700 determines whether the number of reading speed values in the initial set is greater than a second threshold (e.g., 15). If number of reading speed value is not greater than the second threshold, the method 700 ends. If the number of reading speed values is greater than the second threshold, the method 700 proceeds to block 745, where the method 700 determine whether it is possible to create a data set that follows a normal distribution and has a minimum number of reading speed values (e.g., at least 10 reading speed values. If it is not possible to create such a data set, the method 700 ends. If it is possible to create such a data set, the method 700 moves to block 750, where the method 700 creates a new data set, adds a subset of the values from the initial set into the data set, and adds all the remaining values in the initial set and the TES to one or more outlier sets. Referring back to block 725, if the number of reading speed values in the TES is greater than a third threshold (e.g., there are more than 100 reading speed values in the TES), the method 700 creates a data set using a subset of the values in the TES, creates one or more outlier sets, and adds the remaining reading speed values in the TES and the reading speed values in the initial set to the one or more outlier sets at block 730.

Referring back to block 710, if there are existing data sets, the method moves to block 755, where the method 700 determines whether the reading speed value can be added to an existing data set. For example, the method 700 may determine whether the reading speed value fits within the normal probability distribution for the reading speed values in any of the existing data sets. If the reading speed value fits within the normal probability distribution of more than one existing data set, the method 700 may identify the data set which has the least standard deviation for the reading speed value. At block 780, the reading speed value is added to the existing data set. If the reading speed value cannot be added to an existing data set (e.g., the reading speed value is an outlier), the method 700 adds the reading speed value the appropriate outlier set at block 760 (as described above in conjunction with FIG. 4). AT block 765, the method 700 determines whether the number of reading speed values in the outlier set is greater than a fourth threshold. If the number of reading speed values in the outlier set is not greater than the fourth threshold, the method 700 ends. If the number of reading speed values in the outlier set is greater than the threshold, the method 700 proceeds to block 770, where the method 700 determines whether a data set that follows a normal distribution and has a minimum number of reading speed values (e.g., 10) can be created using a subset of the reading speed values in the outlier set. If such a set can be created, the method 700 creates a new data set and adds the subset of the reading speed values from the outlier set to the new data set at block 775. If such a set cannot be created, the method 700 ends.

In one embodiment, blocks 715 through 750 of the method 700 may be performed during a first phase or stage of a reading speed calculation operation or method. In another embodiment, blocks 755 through 780 may be performed during a second phase or stage of a reading speed calculation operation or method. In one embodiment, the method 700 may be performed for each reading speed value that is obtained (e.g., received or calculated) by a user device.

FIG. 8 is a flow diagram illustrating a method 800 of calculating an average reading speed for a user, according to one embodiment. The method 800 may be performed by processing logic that comprises hardware (e.g., circuitry, dedicated logic, programmable logic, microcode, etc.), software (e.g., instructions run on a processor to perform hardware simulation), or a combination thereof. In one embodiment, method 800 may be performed by a reading speed module, as shown in FIG. 5. In another embodiment, the method 800 may be performed for each reading speed value that is obtained (e.g., received or calculated) by the user device. In a further embodiment, the method 800 may be performed after the method 700 of FIG. 7 has been performed. For example, the method 800 may be performed after a reading speed value is added to the initial set, the threshold exceeding set, a data set, or an outlier set.

Referring to FIG. 8, the method 800 begins at block 805 where the method determines whether there are any existing data sets. If there are existing data sets, the method 800 proceeds to block 835 where the method determines whether there is only one data set. If there is only one data set, the method 800 proceeds to block 840 where the method 800 calculates the average reading speeding by using the average of the reading speed values in the one data set. If there is more than one data set, the method 800 proceeds to bock 845, where the method 800 calculates the average reading speed by using the weighted average for all data sets that have a minimum number of reading speed values (e.g., e.g., any data set that is ⅓ the size of the largest data set).

Referring back to block 805, if there are no existing data sets, the method 800 determines whether the number of values in the initial set is greater than a first threshold at block 810. If the number of reading speed values in the initial set is greater than the first threshold, the method 800 calculates the average reading speed using the average of the reading speed values in the initial set. If the number of reading speed values in the initial is not greater than the first threshold, the method 800 determines whether the number of reading speed values is between one and the first threshold at block 815. If the number of reading speed values is between one and the first threshold, the method 800 calculates the average reading speed using the weighted average of the values in the initial set and the threshold exceeding set at block 820. If the number of reading speeds is not between one and the first threshold, the method 800 calculates the average reading speed using the average of reading speed values in the threshold exceeding set.

Figure 9:
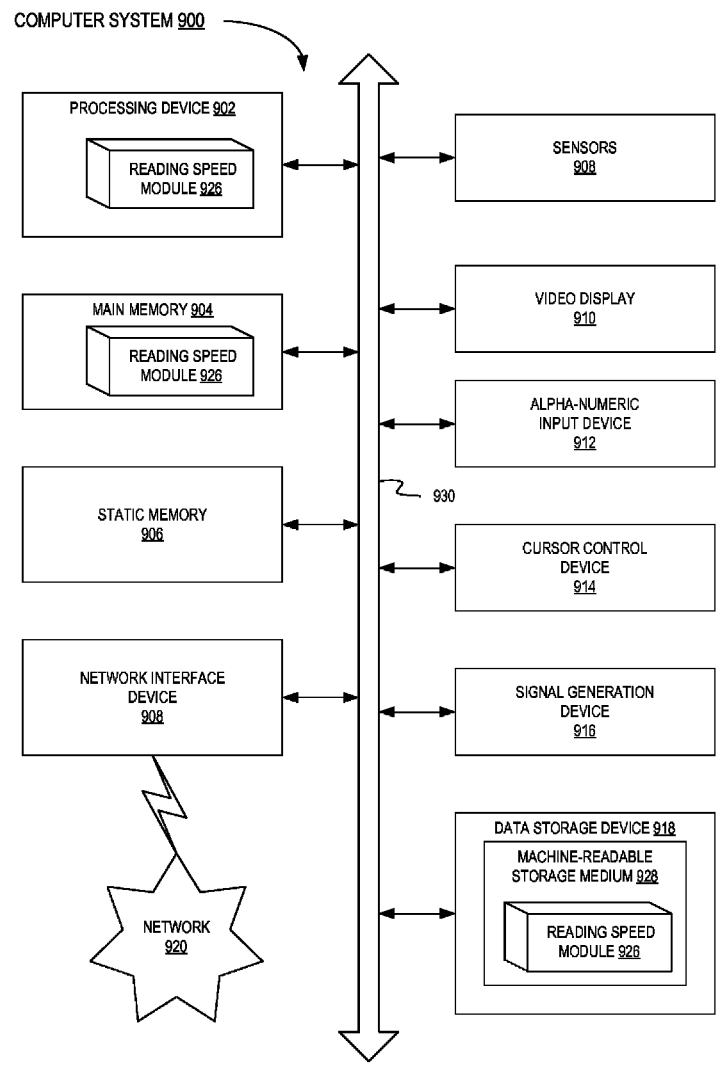
FIG. 9 is a block diagram illustrating an exemplary user device, according to an embodiment.

FIG. 9 illustrates a diagrammatic representation of a machine in the exemplary form of a computer system 900 within which a set of instructions, for causing the machine to perform any one or more of the methodologies discussed herein, may be executed. The system 900 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, a WiFi network, a cellular network, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processing device (e.g., a processor) 902, a main memory 904 (e.g., read-only memory (ROM), flash memory, dynamic random access memory (DRAM) such as synchronous DRAM (SDRAM)), a static memory 906 (e.g., flash memory, static random access memory (SRAM)) and a data storage device 918, which communicate with each other via a bus 930.

Processing device 902 represents one or more general-purpose processing devices such as a microprocessor, central processing unit, or the like. More particularly, the processing device 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 902 may also be one or more special-purpose processing devices such as an application specific integrated circuit (ASIC), a field programmable gate array (FPGA), a digital signal processor (DSP), network processor, or the like. The processing device 902 is configured to execute reading speed module 926 for performing the operations and steps discussed herein.

The computer system 900 may further include a network interface device 908 which may communicate with a network 920. The network 920 may be one or more of a public network such as the Internet or a private network such as a local area network (LAN), a wired network, a wireless network, a WiFi network, a cellular network, etc. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse) and a signal generation device 916 (e.g., a speaker). In one embodiment, the video display unit 910, the alphanumeric input device 912, and the cursor control device 914 may be combined into a single component or device (e.g., an LCD touch screen). The sensors 908 may include one or more touch sensors, proximity sensors or motion sensors that the user device can use to identify whether the user device is being held by a user, and an optical sensor (e.g., a low resolution camera having 0.2 or 0.3 Megapixels) that may be used to takes images on a periodic basis (e.g., may take images of a user's eyes to tracker a user's eye movement).

The data storage device 918 may include a computer-readable medium 928 on which is stored one or more sets of instructions (e.g., instructions of reading speed module 926) embodying any one or more of the methodologies or functions described herein. The reading speed module 926 may also reside, completely or at least partially, within the main memory 904 and/or within the processing device 902 during execution thereof by the computer system 900, the main memory 904 and the processing device 902 also constituting computer-readable media. The instructions may further be transmitted or received over a network 920 via the network interface device 908.

While the computer-readable storage medium 928 is shown in an exemplary embodiment to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

The term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media and magnetic media.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "creating," "determining," "calculating," "adding," "estimating," "including," "tracking," "displaying," "multiplying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

The above description sets forth numerous specific details such as examples of specific systems, components, methods and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth above are merely exemplary. Particular implementations may vary from these exemplary details and still be contemplated to be within the scope of the present invention.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   detecting, using an optical sensor of a user device, that a user is viewing an electronic publication presented on a display of the user device, the detecting including tracking eye movement of the user;
   determining a plurality of reading speed values, wherein each reading speed value, of the plurality of reading speed values, is associated with a respective portion of the electronic publication and is determined based on tracking the eye movement of the user;
   determining a first normal probability distribution from the plurality of reading speed values;
   determining an outlier distribution from the plurality of reading speed values, wherein reading speed values in the outlier distribution do not follow a normal distribution;
   determining a second normal probability distribution using a subset of the reading speed values in the outlier distribution;
   calculating, by a processing device of the user device, a weighted average reading speed using reading speed values in one or more of the first normal probability distribution or the second normal probability distribution;
   estimating an amount of time remaining for a user to finish reading an unread portion of the electronic publication based on the weighted average reading speed; and
   causing presentation of the amount of time remaining on the display of the user device.

2. The method of claim 1, further comprising:
   determining a second plurality of reading speed values after calculating the weighted average reading speed, wherein a second reading speed value is indicative of a speed at which a user read a second corresponding portion of the electronic publication;
   determining additional outlier distributions and additional normal probability distributions from one or more of the plurality of reading speed values or the second plurality of reading speed values;
   calculating a second weighted average reading speed using reading speed values in the one or more of the first normal probability distribution, the second normal probability distribution, or the additional normal probability distributions.

3. The method of claim 1, wherein the first normal probability distribution is used to calculate the weighted average reading speed when a first size of the first normal probability distribution is greater than a threshold size and wherein the second normal probability distribution is used to calculate the weighted average reading speed when a second size of the second normal probability distribution is greater than the threshold size.

4. The method of claim 1, further comprising:
adding each of the plurality of reading speed values to a first set if the reading speed value is above a first threshold or to a second set if the reading speed value is below the first threshold; and
calculating a second weighted average reading speed using one or more of the first set or the second set.

5. A device comprising:
an optical sensor;
a memory configured to store a plurality of reading speed values; and
a processing device, coupled to the memory, the processing device configured to:
determine, using the optical sensor configured to track eye movement of a user viewing an electronic publication, a first reading speed value of a plurality of reading speed values, wherein the first reading speed value corresponds to a respective portion of the electronic publication;
determine a plurality of probability distributions from the plurality of reading speed values;
determine a plurality of outlier distributions from the plurality of reading speed values;
determine an additional probability distribution using a subset of reading speed values in one of the plurality of outlier distributions when a number of reading speed values in the subset is greater than a threshold size; and
calculate a weighted average reading speed using one or more of the plurality of probability distributions and the additional probability distribution.

6. The device of claim 5, wherein the plurality of probability distributions comprise normal probability distributions.

7. The device of claim 5, wherein the processing devices is further configured to:
estimate an amount of time remaining for the user to finish reading a portion of the electronic publication, based on the weighted average reading speed; and
cause display of data indicative of the amount of time remaining.

8. The device of claim 5, wherein calculating the weighted average reading speed using one or more of the plurality of probability distributions comprises:
calculating the weighted average reading speed using probability distributions that are greater than the threshold size.

9. The device of claim 5, wherein the processing device is further configured to:
add each of the plurality of reading speed values to a first set if the reading speed value is above a first threshold or to a second set if the reading speed value is below the first threshold; and
calculate a second weighted average reading speed using one or more of the first set or the second set.

10. The device of claim 9, wherein calculating the second weighted average reading speed comprises one of:
calculating the second weighted average reading speed using reading speed values in the first set;
calculating the second weighted average reading speed using reading speed values in the second set; or
calculating the second weighted average reading speed using reading speed values in the first set and the second set.

11. The device of claim 9, wherein one or more of the plurality of probability distributions or one or more plurality of outlier distributions are determined using reading speed values from one or more of the first set or the second set.

12. The device of claim 5, wherein the processing device is further configured to:
determine an additional reading speed value;
determine a probability distribution from the plurality of probability distributions that has an average value that provides a lowest standard deviation for the additional reading speed value; and
include the additional reading speed value in the probability distribution.

13. The device of claim 5, wherein each reading speed value is indicative of a speed at which the user read the respective portion of an electronic publication.

14. The device of claim 5, wherein reading speed values in the plurality of outlier distributions do not follow a normal distribution.

15. A non-transitory computer-readable storage medium storing instructions which, when executed, cause a processing device to perform operations comprising:
determining, using an optical sensor configured to track eye movement of a user viewing an electronic publication, a plurality of reading speed values, wherein a first reading speed value corresponds to a respective portion of the electronic publication;
adding each reading speed value into one of a plurality of data sets or into one of a plurality of outlier sets;
adding a subset of reading speed values to a new data set when the subset of reading speed values from one of the plurality of outlier sets follows a normal probability distribution and when a number of reading speed values in the subset is greater than a threshold size;
estimating, by the processing device, an amount of time remaining for the user to finish reading the electronic publication, based on one or more of the plurality of data sets and the new data set; and
causing display of data indicative of the amount of time remaining.

16. The non-transitory computer-readable storage medium of claim 15, wherein the operations further comprise:
determining a second plurality of reading speed values, each corresponding to a respective portion of the electronic publication;
adding each of the second plurality of reading speed values to a first set of reading speed values if the reading speed value is above a first threshold or to a second set if the reading speed value is below the first threshold; and
calculating a first average reading speed based on one or more of the first set or the second set.

17. The non-transitory computer-readable storage medium of claim 16, wherein the operations further comprise:
creating a first data set and a first outlier set when a number of reading speed values in the second set is above a second threshold; and
adding reading values from the second set to the first data set and adding reading speed values from the first set to first outlier dataset.

18. The non-transitory computer-readable storage medium of claim 16, wherein calculating the first average reading speed comprises one of:
calculating the first average reading speed using reading speed values in the first set;

calculating the first average reading speed using reading speed values in the second set; or calculating the first average reading speed using a weighted average of reading speed values in the first set and the second set.

19. The non-transitory computer-readable storage medium of claim 15, wherein estimating the amount of time remaining comprises:

calculating an average reading speed using a weighted average of reading speed values from data sets that are greater than the threshold size.

20. The non-transitory computer-readable storage medium of claim 15, wherein the plurality of data sets follow a normal probability distribution.

21. The non-transitory computer-readable storage medium of claim 15, wherein determining a plurality of reading speed values comprises:

tracking an amount of time each of the portions is displayed on a display of the user device;

determining a number of words displayed on the display for each of the portions; and calculating the reading speed based on the number of words per portion and the amount of time.

22. The non-transitory computer-readable storage medium of claim 15, wherein estimating the amount of time remaining further comprises:

determining a number of portions remaining in the electronic publication; and multiplying the number of portions remaining by the average reading speed.

23. The non-transitory computer-readable storage medium of claim 15, wherein each reading speed value is indicative of a speed at which the user read a respective portion of an electronic publication.

24. The non-transitory computer-readable storage medium of claim 15, wherein reading speed values in the plurality of outlier sets do not follow a normal distribution.

* * * * *